US010391923B2

(12) United States Patent
Grider et al.

(10) Patent No.: US 10,391,923 B2
(45) **Date of Patent: *Aug. 27, 2019**

(54) AUTOMOTIVE EXTERIOR LAMP ASSEMBLY WITH CHARGE PORT

(71) Applicant: Ford Global Technologies, LLC, Dearborn, MI (US)

(72) Inventors: Duane M. Grider, Farmington Hills, MI (US); Bala Chander, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,921

(22) Filed: Sep. 28, 2018

(65) Prior Publication Data

US 2019/0031081 A1 Jan. 31, 2019

Related U.S. Application Data

(63) Continuation of application No. 15/882,525, filed on Jan. 29, 2018, now Pat. No. 10,106,071, which is a continuation of application No. 15/355,950, filed on Nov. 18, 2016, now abandoned, which is a continuation of application No. 14/840,090, filed on Aug. 31, 2015, now Pat. No. 9,499,089, which is a continuation of application No. 12/493,514, filed on Jun. 29, 2009, now Pat. No. 9,132,740.

(51) Int. Cl.

| | |
|---|---|
| ***B60Q 1/00*** | (2006.01) |
| ***F21S 9/02*** | (2006.01) |
| ***H02J 7/00*** | (2006.01) |
| ***B60L 53/14*** | (2019.01) |
| ***B60L 53/16*** | (2019.01) |

(52) U.S. Cl.

CPC ............ *B60Q 1/0017* (2013.01); *B60L 53/14* (2019.02); *B60L 53/16* (2019.02); *B60Q 1/0094* (2013.01); *F21S 9/02* (2013.01); *H02J 7/0047* (2013.01); *H02J 7/0052* (2013.01); *B60L 2250/16* (2013.01); *H02J 2007/005* (2013.01); *Y02T 10/7005* (2013.01); *Y02T 10/7072* (2013.01); *Y02T 90/14* (2013.01); *Y02T 90/168* (2013.01); *Y04S 30/12* (2013.01)

(58) Field of Classification Search

CPC ....... B60Q 3/0279; B60Q 1/04; B60Q 1/0017
USPC ................................................ 362/459–549
See application file for complete search history.

(56) References Cited

U.S. PATENT DOCUMENTS

2005/0105296 A1* 5/2005 French .................... B60D 1/60 362/545
2011/0175569 A1* 7/2011 Austin ............... B60L 11/1824 320/109

* cited by examiner

*Primary Examiner* — William J Carter
(74) *Attorney, Agent, or Firm* — David B. Kelley; Brooks Kushman P.C.

(57) ABSTRACT

A vehicle includes a battery charger and an exterior lamp assembly. The assembly includes a housing defining a cavity, and an electrical port including at least one electrical terminal disposed within the cavity, electrically connected with the battery charger, and configured to be electrically connected with an electrical power grid remote from the vehicle.

7 Claims, 2 Drawing Sheets

AUTOMOTIVE EXTERIOR LAMP ASSEMBLY WITH CHARGE PORT

CROSS-REFERENCE TO RELATED APPLICATIONS

This application is a continuation of application Ser. No. 15/882,525, filed Jan. 29, 2018, which is a continuation of application Ser. No. 15/355,950, filed Nov. 18, 2016, which is a continuation of application Ser. No. 14/840,090, filed Aug. 31, 2015, now U.S. Pat. No. 9,499,089, issued Nov. 22, 2016, which is a continuation of application Ser. No. 12/493,514, filed Jun. 29, 2009, now U.S. Pat. No. 9,132,740, issued Sep. 15, 2015, the disclosures of which are hereby incorporated in their entirety by reference herein.

BACKGROUND

U.S. Pat. No. 5,344,331 to Hoffman et al. discloses an electrical connector system for transmitting electrical energy for use with electric vehicles. The electrical connector system includes a male electrical connector or plug with a first set of electrical contacts arranged along a common arc, and a female electrical connector or receptacle with a second set of electrical contacts arranged along a common arc. Both the receptacle and the plug have an apertured shutter for selectively covering and uncovering its respective electrical contacts to prevent inadvertent contact with the electrical contacts, and to protect the electrical contacts from the environment. In the preferred embodiment, the shutters of the plug and receptacle are rotated to uncover the contacts only after full insertion of the plug into the receptacle.

U.S. Pat. No. 6,351,098 to Kaneko discloses an electromagnetic induction type connection terminal for connecting a power supply station with a battery for charging the battery. The connection terminal has a charging paddle and charging receptacle. The charging paddle has a primary coil that is supplied with a current from the power supply station. The charging receptacle has a secondary coil connected to the battery. When the primary coil is supplied with a current from the power supply station, an electromotive force is induced into the secondary coil. The charging receptacle has an enclosure for accommodating the secondary coil. The enclosure forms a shield against electromagnetic waves.

U.S. Pat. No. 6,459,234 to Kajiura discloses a power supply paddle of a charger. The power supply paddle is provided at one end of a cable extending from a power source apparatus. A paddle holder casing which receives and holds therein the power supply paddle is obliquely provided on one side wall of a housing of the power source apparatus, so that an opening of the paddle holder casing is oriented slightly upwardly from the horizontal direction. The power supply paddle is received and held in the paddle holder casing when it is not being used.

SUMMARY

A vehicle includes a battery charger and an exterior lamp assembly. The assembly includes an electrical port that is electrically connected with the battery charger and that can be electrically connected with an electrical power grid remote from the vehicle. The assembly may further include an illumination source, and the vehicle may further include at least one controller that, in response to the battery charger being operational, activates the illumination source. The assembly may further include an interface that displays information related to the battery charger or vehicle. The electrical port may include at least one electrical terminal oriented in a generally downward direction. The assembly may further include a housing defining a cavity and the at least one electrical terminal may be disposed within the cavity. The assembly may further include a panel to conceal the cavity. The panel may be a door. The assembly may be a tail lamp assembly, a head lamp assembly, a turn signal lamp assembly, a side marker lamp assembly, or a center high mount stop lamp assembly.

A vehicle subsystem includes an exterior lamp assembly. The assembly includes an illumination source and an electrical port that can be electrically connected with a power source remote from the vehicle. The electrical port may include at least one electrical terminal. The assembly may further include a housing defining a cavity and the at least one electrical terminal may be disposed within the cavity. The assembly may further include a panel to conceal the cavity. The panel may be a door. The assembly may be a tail lamp assembly, a head lamp assembly, a turn signal lamp assembly, a side marker lamp assembly, or a center high mount stop lamp assembly.

A vehicle includes a battery charger and an exterior lamp assembly. The assembly includes a housing defining a cavity and an electrical port including at least one electrical terminal that is disposed within the cavity, is electrically connected with the battery charger, and can be electrically connected with an electrical power grid remote from the vehicle. The at least one electrical terminal may be oriented in a generally downward direction. The assembly may further include a panel to conceal the cavity. The panel may be a door.

DETAILED DESCRIPTION

External electrical plug connections to vehicles may not be located or designed with ergonomic, environmental, complexity, and/or cost considerations in mind. As an example, original equipment manufacturer installations of block heater connections often include a length of electric extension cord coiled and attached at, near, or behind the vehicle's front grille. These installations may be cumbersome and/or difficult to use because of their location. In addition, any terminals associated with the cord may not be protected from the environment.

As another example, electrical plug connections of alternatively powered vehicles may be provided within engine compartments, or behind doors of body panels. Accessing an electrical plug within an engine compartment may be inconvenient because of its location. Additionally, because some vehicles are provided in alternatively powered and conventional versions, providing a door for a body panel may require separate sets of tooling: one set for a body panel without a door for the conventional version, and one set for the body panel with the door for the alternatively powered version. Separate sets of tooling may increase the complexity and cost associated with manufacturing the vehicle.

Certain embodiments disclosed herein provide an electrical port integrated with a lamp assembly of a plug-in vehicle. The lamp assembly may be, for example, a tail lamp assembly, a head lamp assembly, a turn signal lamp assembly, a side marker lamp assembly, and/or a center high mount stop lamp assembly. Illumination sources for these assemblies may include, for example, light bulbs, LEDs, LCDs, etc. (all generally referred to herein as lamps). The electrical port provides electrical access to a charging system for the vehicle's battery.

Some of these arrangements may reduce complexity and cost because, for example, separate sets of body panel tooling are not necessary if producing alternatively powered and conventional versions of the vehicle. Some of these arrangements may also reduce bending and/or stooping by a user when connecting or disconnecting an electrical source with the electrical port.

Figure 1:
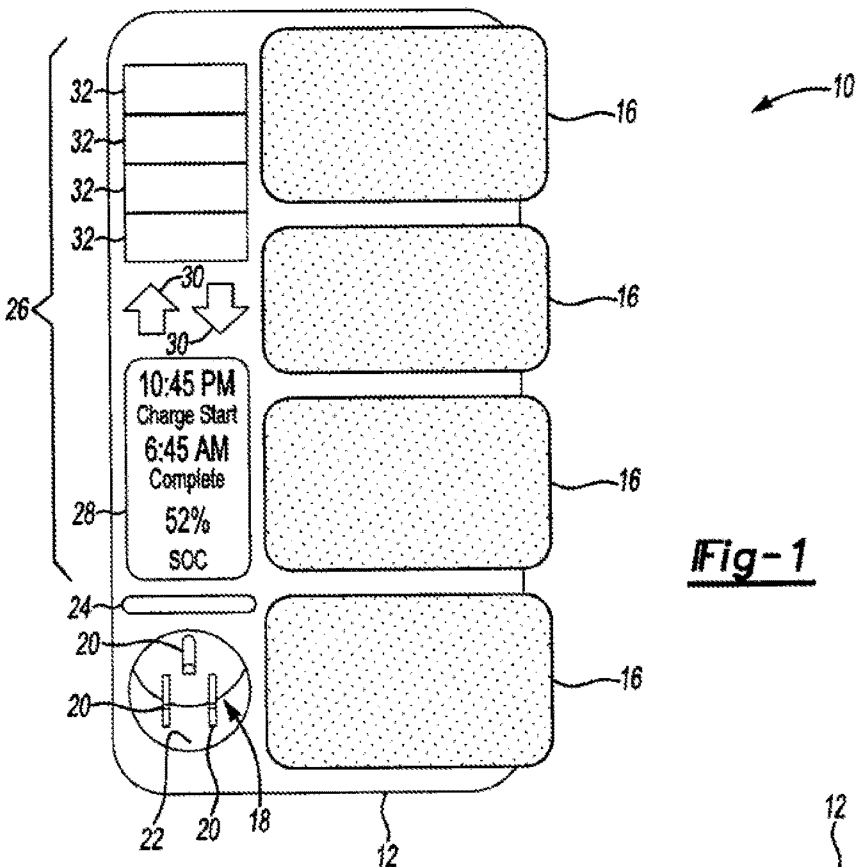
FIG. 1 is a front view of an embodiment of a lamp assembly.
Figure 2:
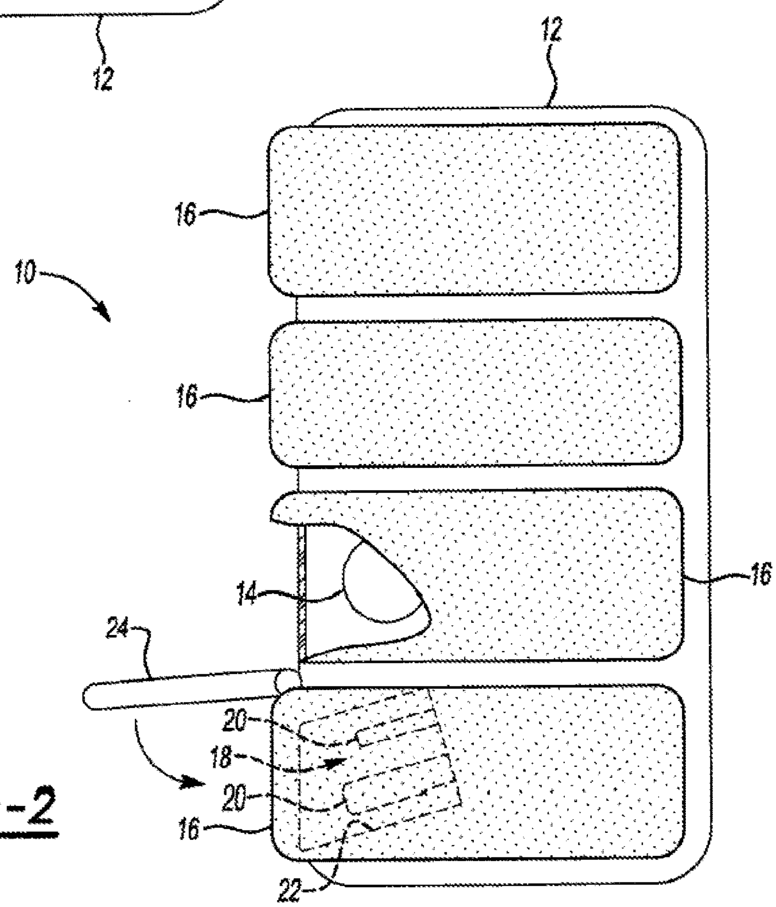
FIG. 2 is a side view of the lamp assembly of FIG. 1.

Referring now to FIGS. 1 and 2, an embodiment of an automotive tail lamp assembly 10 may include a housing 12, lamps 14, lamp covers 16, and an electrical port 18. While the electrical port 18 is located near the bottom of the assembly 10, in other embodiments, the electrical port 18 may be disposed in any suitable location. The electrical port 18 includes several blades 20. The blades 20 are configured to receive an electrical socket similar to those found on household extension cords, and as explained below, may be electrically connected with a charging system for a power storage unit. In other embodiments, the electrical port 28 may be an electrical socket, or any other suitable electrical connector, etc.

The blades 20 may be disposed within a cavity formed by a surface 22 of the housing 12. (Alternatively, the blades 20 may extend away from the housing 12). This cavity may shield the blades 20 from, for example, debris, water, etc. A spring loaded (or other type of) door 24 (illustrated in the open position) may cover the opening of the cavity providing further protection for the blades 20 from the environment. In other embodiments, any suitable panel covering (e.g., sliding panel) may be used to cover the opening of the cavity.

The cavity and blades 20 of FIGS. 1 and 2 are positioned at approximately −20° relative to horizontal (an example of being oriented in a generally downward direction). This orientation may reduce the amount of debris and moisture that can accumulate within the cavity and on the blades 20. For example, gravity may act to draw particulate matter and water droplets out from the cavity. Of course, the cavity and blades 20 may have other upward or downward orientations.

The assembly 10 may further include an interface 26. In the embodiment of FIG. 1, the interface 26 includes a portion 28 configured to indicate state of charge, as well as charge start and completion times using, for example, LED, LCD, etc., technology. Control/input buttons 30 may permit a user, for example, to scroll through various information presented via the portion 28, or select a desired charge start time. Indicator lights/lamps 32 may be lit to indicate state of charge: the higher the state of charge, the more indicator lights 32 may be lit. (The lamps 14 may also provide this feature.) Additionally, at least one of the lamps 14 may be lit to indicate that the vehicle is plugged-in and/or that the vehicle's battery is being charged, etc. Other embodiments may include any suitable interface conveying any desired information such as vehicle/charging diagnostic information, battery function/diagnostic information, etc.

Figure 3:
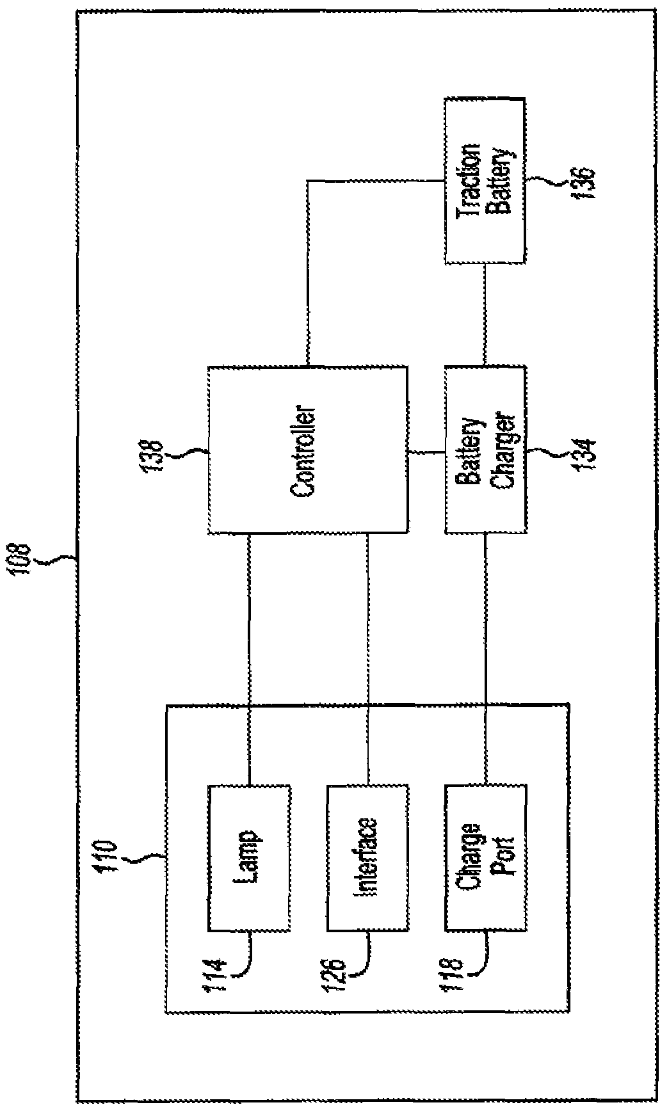
FIG. 3 is an embodiment of an automotive vehicle.

Referring now to FIG. 3, numbered elements of FIG. 3 that differ by 100 relative to the numbered elements of FIGS. 1 and 2 may have similar descriptions to the numbered elements of FIGS. 1 and 2. An embodiment of an automotive vehicle 108 (electric vehicle, hybrid electric vehicle, etc.) may include a lamp assembly 110, battery charger 134, traction battery 136 and controller(s) 138. As known in the art, electrical power stored by the traction battery 136 may be transformed to motive power to move the vehicle 108.

The battery charger 134 is electrically connected with the charge port 118 and traction battery 126. Power from an electrical grid may thus be passed to the traction battery 136 via the charge port 118 and battery charger 134. Electromagnetic shielding may surround some/all of the electrical connections, and may take the form of a braided foil or other suitable electromagnetic shielding. This shielding may reduce/eliminate unwanted electromagnetic noise as known in the art.

The controller(s) 138 may be in communication with and/or control the lamp 114, interface 126, battery charger 134 and/or traction battery 136.

As discussed above, the lamp 114 and/or interface 116 may be used to convey information about, for example, whether the vehicle 108 is plugged-in, the state of charge of the traction battery 136, etc. In the embodiment of FIG. 3, the controller(s) 138 may monitor the battery charger 134, the traction battery 136, etc. in a known fashion, and control the lamp 114 and/or interface 126 based on this information. As an example, the controller(s) 138 may determine whether the vehicle 108 is plugged-in based on whether the battery charger 134 is active. If active, the controller(s) 138 may command the lamp 114 on. As another example, the controller(s) 138 may determine the state of charge of the battery 136 and command the interface 126 to display such information in a known fashion, etc. Other scenarios are also possible.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed is:

1. A vehicle comprising:

a battery charger;

an exterior lamp assembly including an illumination source, and an electrical port electrically connected with the battery charger and configured to be electrically connected with an electrical power grid remote from the vehicle; and at least one controller configured to, responsive to the battery charger being operational, activate the illumination source.

2. The vehicle of claim 1, wherein the exterior lamp assembly further includes an interface configured to display information related to the battery charger or vehicle.

3. The vehicle of claim 1, wherein the electrical port includes at least one electrical terminal oriented in a generally downward direction.

4. The vehicle of claim 3, wherein the exterior lamp assembly further includes a housing defining a cavity and wherein the at least one electrical terminal is disposed within the cavity.

5. The vehicle of claim 4, wherein the exterior lamp assembly further includes a panel to conceal the cavity.

6. The vehicle of claim 5, wherein the panel is a door.

7. The vehicle of claim 1, wherein the exterior lamp assembly is a tail lamp assembly, a head lamp assembly, a turn signal lamp assembly, a side marker lamp assembly, or a center high mount stop lamp assembly.

* * * * *